United States Patent
Robin

(10) Patent No.: US 7,972,525 B2
(45) Date of Patent: Jul. 5, 2011

(54) AZEOTROPIC AND AZEOTROPE-LIKE COMPOSITIONS OF E-1,1,1,4,4,4-HEXAFLUORO-2-BUTENE

(75) Inventor: Mark L. Robin, Middletown, DE (US)

(73) Assignee: E. I. du Pont de Nemours and Company, Wilmington, DE (US)

(*) Notice: Subject to any disclaimer, the term of this patent is extended or adjusted under 35 U.S.C. 154(b) by 0 days.

(21) Appl. No.: 12/598,038

(22) PCT Filed: Jun. 12, 2008

(86) PCT No.: PCT/US2008/066621
§ 371 (c)(1),
(2), (4) Date: Oct. 29, 2009

(87) PCT Pub. No.: WO2008/154612
PCT Pub. Date: Dec. 18, 2008

(65) Prior Publication Data
US 2010/0163776 A1 Jul. 1, 2010

Related U.S. Application Data

(60) Provisional application No. 60/934,199, filed on Jun. 12, 2007, provisional application No. 60/934,209, filed on Jun. 12, 2007, provisional application No. 60/936,082, filed on Jun. 18, 2007, provisional application No. 60/937,590, filed on Jun. 28, 2007, provisional application No. 60/970,384, filed on Jun. 6, 2007, provisional application No. 60/970,387, filed on Jun. 6, 2007, provisional application No. 60/993,241, filed on Jun. 10, 2007.

(51) Int. Cl.
| | | |
|---|---|---|
| A62D 1/00 | (2006.01) |
| C09K 5/00 | (2006.01) |
| C09K 5/04 | (2006.01) |
| C09K 3/00 | (2006.01) |
| B01F 1/00 | (2006.01) |
| C23G 5/00 | (2006.01) |
| H01B 3/24 | (2006.01) |
| C11D 17/00 | (2006.01) |
| C11D 17/08 | (2006.01) |
| C07C 17/00 | (2006.01) |
| C07C 19/08 | (2006.01) |
| C07C 21/18 | (2006.01) |
| C07C 23/00 | (2006.01) |
| C07C 25/13 | (2006.01) |

(52) U.S. Cl. ....... 252/2; 252/67; 252/71; 252/182.12; 252/364; 252/570; 510/408; 510/415; 570/123

(58) Field of Classification Search ............. 252/2, 67, 252/71, 182.12, 364, 570; 510/177, 408, 510/415; 570/123
See application file for complete search history.

(56) References Cited

U.S. PATENT DOCUMENTS

| | | | |
|---|---|---|---|
| 3,085,918 A | | 4/1963 | Sherliker et al. |
| 3,723,318 A | | 3/1973 | Butler |
| 3,884,828 A | | 5/1975 | Butler |
| 4,085,073 A | | 4/1978 | Suh et al. |
| 4,394,491 A | | 7/1983 | Hoffman |
| 4,613,708 A | | 9/1986 | Riess et al. |
| 4,704,410 A | | 11/1987 | Booth et al. |
| 4,704,411 A | | 11/1987 | Gansow et al. |
| 5,037,572 A | | 8/1991 | Merchant |
| 5,164,419 A | | 11/1992 | Bartlett et al. |
| 5,204,159 A | | 4/1993 | Tan |
| 5,332,761 A | | 7/1994 | Paquet et al. |
| 5,463,150 A | | 10/1995 | Lui et al. |
| 5,516,951 A | * | 5/1996 | Aoyama ............... 570/175 |
| 5,578,137 A | | 11/1996 | Shealy |
| 5,674,621 A | * | 10/1997 | Visser et al. ............ 428/408 |
| 5,900,185 A | | 5/1999 | Tapscott |
| 5,908,822 A | | 6/1999 | Dishart |
| 5,977,271 A | | 11/1999 | McKay et al. |
| 6,071,580 A | | 6/2000 | Bland et al. |
| 6,590,005 B2 | | 7/2003 | Singh et al. |
| 6,610,250 B1 | | 8/2003 | Tuma |
| 6,703,431 B2 | | 3/2004 | Dietzen et al. |
| 6,787,580 B2 | | 9/2004 | Chonde et al. |

(Continued)

FOREIGN PATENT DOCUMENTS

DE 253431 2/1976

(Continued)

OTHER PUBLICATIONS

H. Boden et. al., Chapter 4, Polyurethane Handbook, Edited by G. Oertel, Hanser Publishers, NY 1985.

H. Grunbauer et. al., "Fine Celled CFC-Free Rigid Roam—New Machinery With Low Boiling Blowing Agents", Published in Polyurethanes 92 From the Proceeding of the SPI 34th Annual Technical/Marketing Conference, Oct. 21-24, 1992, New Orleans, Louisiana.

(Continued)

Primary Examiner — Lorna M Douyon
Assistant Examiner — Tanisha Diggs

(57) ABSTRACT

Azeotropic or azeotrope-like compositions are disclosed. The azeotropic or azeotrope-like compositions are mixtures of E-1,1,1,4,4,4-hexafluoro-2-butene with methyl formate, n-pentane, 2-methylbutane, trans-1,2-dichloroethylene, 1,1,1,3,3-pentafluoropropane, n-butane or isobutane. Also disclosed is a process of preparing a thermoplastic or thermoset foam by using such azeotropic or azeotrope-like compositions as blowing agents. Also disclosed is a process of producing refrigeration by using such azeotropic or azeotrope-like compositions. Also disclosed is a process of using such azeotropic or azeotrope-like compositions as solvents. Also disclosed is a process of producing an aerosol product by using such azeotropic or azeotrope-like compositions. Also disclosed is a process of using such azeotropic or azeotrope-like compositions as heat transfer media. Also disclosed is a process of extinguishing or suppressing a fire by using such azeotropic or azeotrope-like compositions. Also disclosed is a process of using such azeotropic or azeotrope-like compositions as dielectrics.

28 Claims, 7 Drawing Sheets

U.S. PATENT DOCUMENTS

| | | | |
|---|---|---|---|
| 2004/0119047 A1 | 6/2004 | Singh et al. | |
| 2004/0167366 A1* | 8/2004 | Rao et al. | 570/177 |
| 2004/0256594 A1 | 12/2004 | Singh et al. | |
| 2005/0233934 A1 | 10/2005 | Singh et al. | |
| 2006/0242985 A1* | 11/2006 | Leck et al. | 62/323.1 |
| 2006/0245944 A1* | 11/2006 | Leck et al. | 417/364 |
| 2007/0077488 A1 | 4/2007 | Chen et al. | |
| 2007/0096051 A1 | 5/2007 | Nappa | |
| 2007/0098646 A1 | 5/2007 | Nappa et al. | |
| 2007/0100009 A1 | 5/2007 | Creazzo et al. | |
| 2007/0100010 A1 | 5/2007 | Creazzo et al. | |
| 2007/0100011 A1 | 5/2007 | Crezzo | |
| 2007/0102021 A1 | 5/2007 | Nappa | |
| 2007/0105738 A1 | 5/2007 | Nappa et al. | |
| 2007/0108403 A1 | 5/2007 | Sievert et al. | |
| 2007/0203045 A1* | 8/2007 | Schweitzer et al. | 510/411 |
| 2007/0203046 A1 | 8/2007 | Minor et al. | |
| 2008/0060687 A1* | 3/2008 | Schweitzer et al. | 134/40 |
| 2008/0269532 A1 | 10/2008 | Swearingen | |
| 2010/0032610 A1* | 2/2010 | Nappa et al. | 252/67 |

FOREIGN PATENT DOCUMENTS

| | | |
|---|---|---|
| EP | 558763 A | 9/1993 |
| EP | 0398147 B1 | 9/1994 |
| EP | 0731162 A1 | 11/1996 |
| EP | 0350316 B1 | 2/1997 |
| GB | 950876 | 2/1964 |
| JP | 5179043 A | 7/1993 |
| JP | 05179043 A * | 7/1993 |
| WO | 9423008 A1 | 10/1994 |
| WO | 2004/037913 A2 | 5/2004 |
| WO | 2005/099718 A1 | 10/2005 |
| WO | 2006/101882 A2 | 9/2006 |
| WO | 2008/134061 | 4/2008 |
| WO | 2008/154612 A1 | 12/2008 |
| WO | 2009/014965 A1 | 1/2009 |
| WO | 2009/014966 A1 | 1/2009 |
| WO | 2009/032983 A1 | 3/2009 |
| WO | 2009/073487 A1 | 6/2009 |
| WO | 2009/085857 A1 | 7/2009 |

OTHER PUBLICATIONS

M. Taverna et. al., "Soluble or Insoluble Alternative Blowing Agents? Processing Technologies for Both Alternatives, Presented by Equipment Manufacturer", Published in Polyurethanes World Congress 1991 From the Proceedings of the SPI/SOPA Sep. 24-26, 1991, Acropolis, Nice, France.

Santini G. et. al., "The Reaction of Perfluoroalkylcopper Compounds With 1-Bromo-Perfluoroalkyethylenes", Tetrahedron, vol. 29, 1973, pp. 2411-2414, XP002427778, Table 3; Compound 2A, 2B.

Devallezbernard et. al., "Solubility of Respiratory Gases in the 1, 2-Bis(F-Alkyl) Ethenes", Journal De Chimie Physique, Societe De Chimie Physique, Paris, France, vol. 85, No. 10, 1988, pp. 947-952, XP008077143.

Gao et al., "Dip-Coating of Ultra Think Liquid Lubricant and its Control for Thin-Film Magnetic Hard Disks", IEEE Transactions on Magnetics, vol. 31, No. 6, 1995, pp. 2982-2984.

Le Blance M et. al., "A Strategy for the Synthesis of Pure, Inert Perfluoroalkylated Derivatives Designed for Flood Substitution", Oxygen Carrying C9olloidal Blood Substitues, Iinternational Symposium Perfluorochem Blood Substitutes, 1982, pp. 43-49, XP008077176.

F. Jeanneaux et al., "Additional Thermique Des Iodo-1-Perfluoroalcanes Sur Les Perfluoroalkylethylenes", Journal of Fluorine Chemistry, 4 (1974), pp. 261-270.

World Meteorological Organization Global Ozone Research and Monitoring Project, Scientific Assessment of Ozone Depletion: 2002, "Source Gases", Report No. 47, Published Mar. 2003, pp. 1.28-1.31.

Kochdopole, R. E. et. al., "Polystyrene Foams", Encyclopedia of Polymer Science, vol. 16 (1989), pp. 193-206.

Pedler A. E. et. al., "The Synthesis and Dehydroflurination of Some Polyfluoroalkanes", J. Fluorine Chem., vol. 1 No. 3, 1972, pp. 337-345, XP002427764.

\* cited by examiner

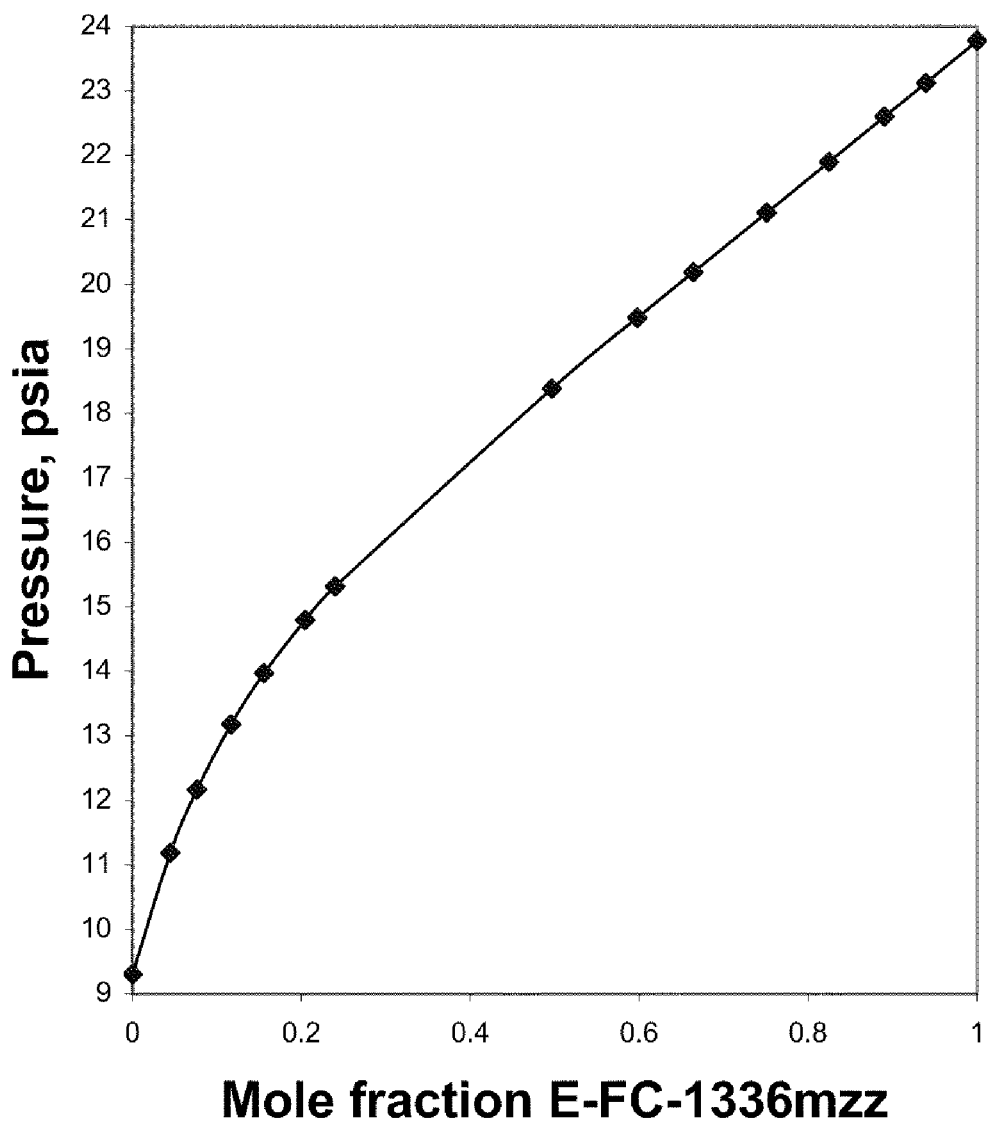

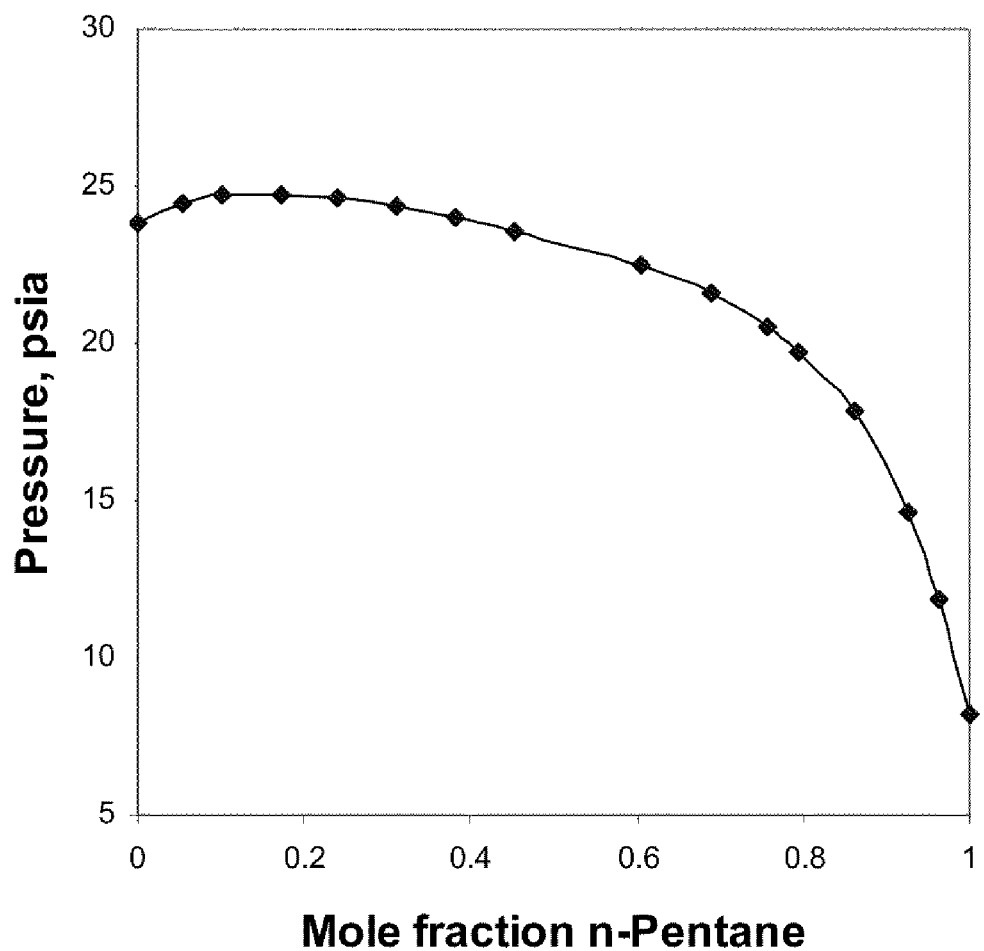
Figure 2. E-FC-1336mzz and n-Pentane at 20 C

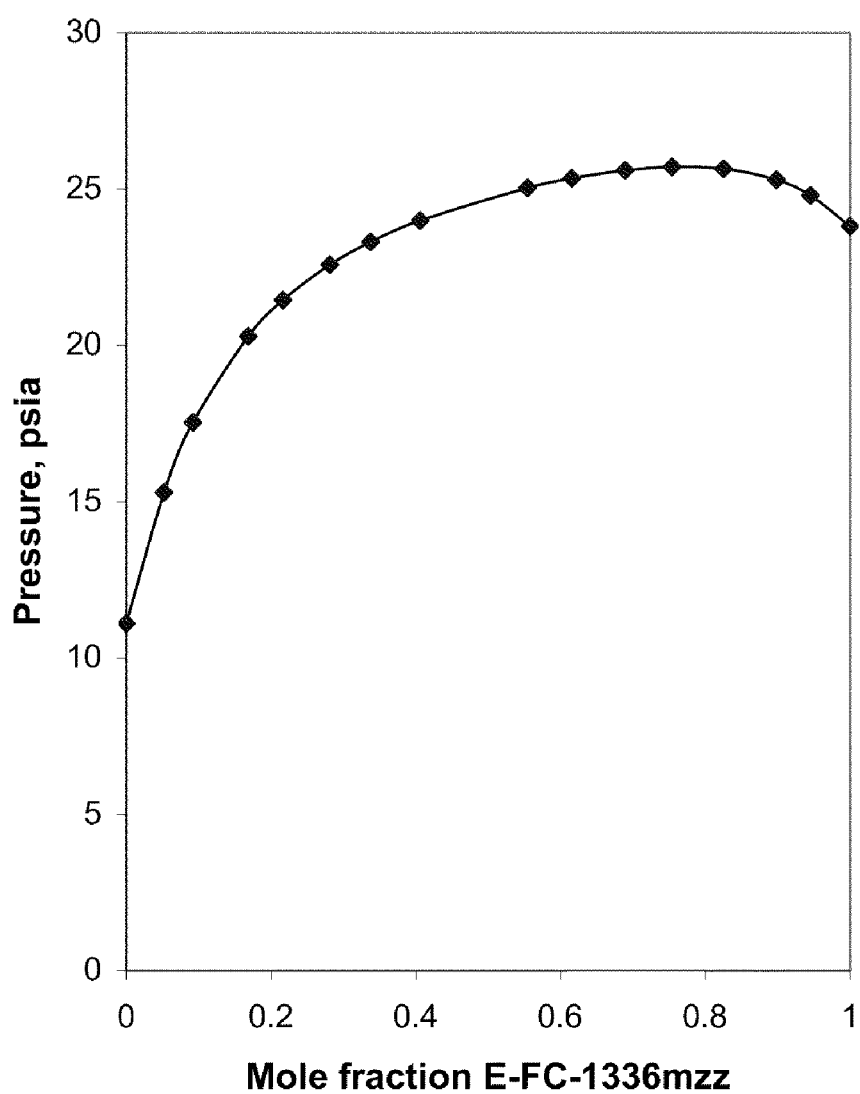
Figure 3. E-FC-1336mzz and Isopentane at 20.0 C

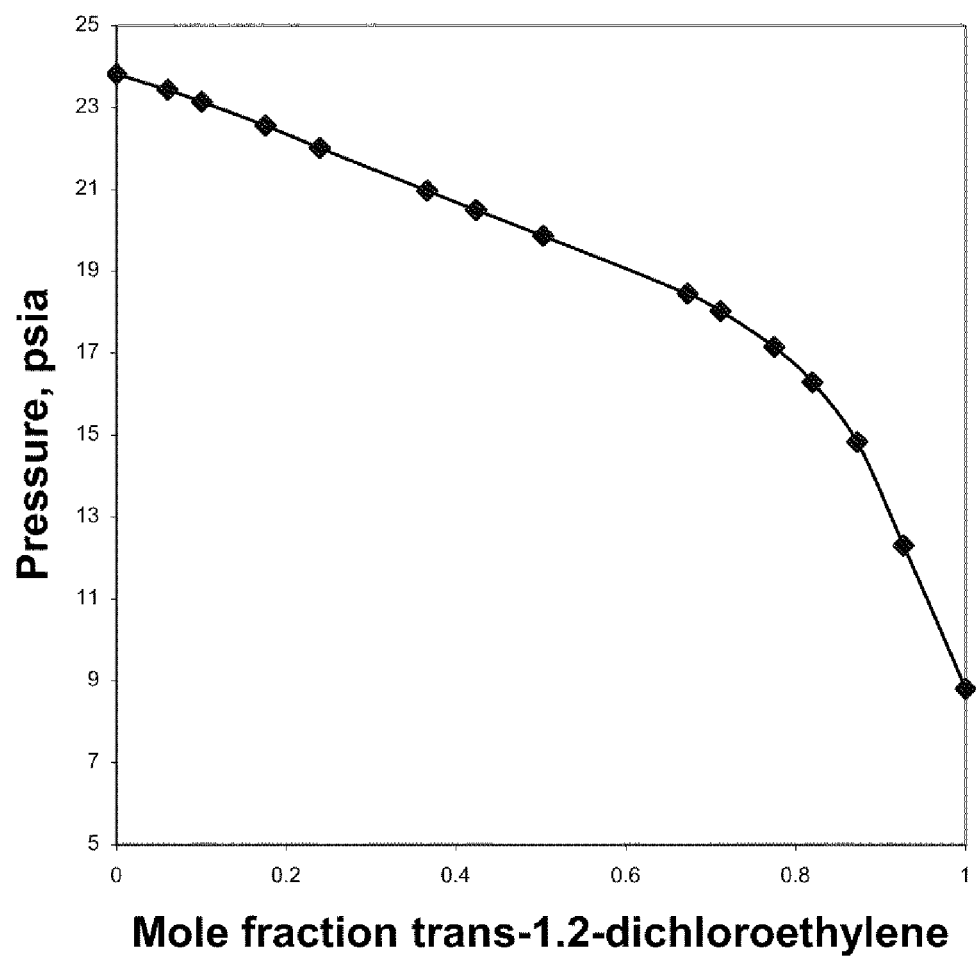
Figure 4. E-FC-1336mzz and trans-1,2-Dichloroethylene at 20.0 C

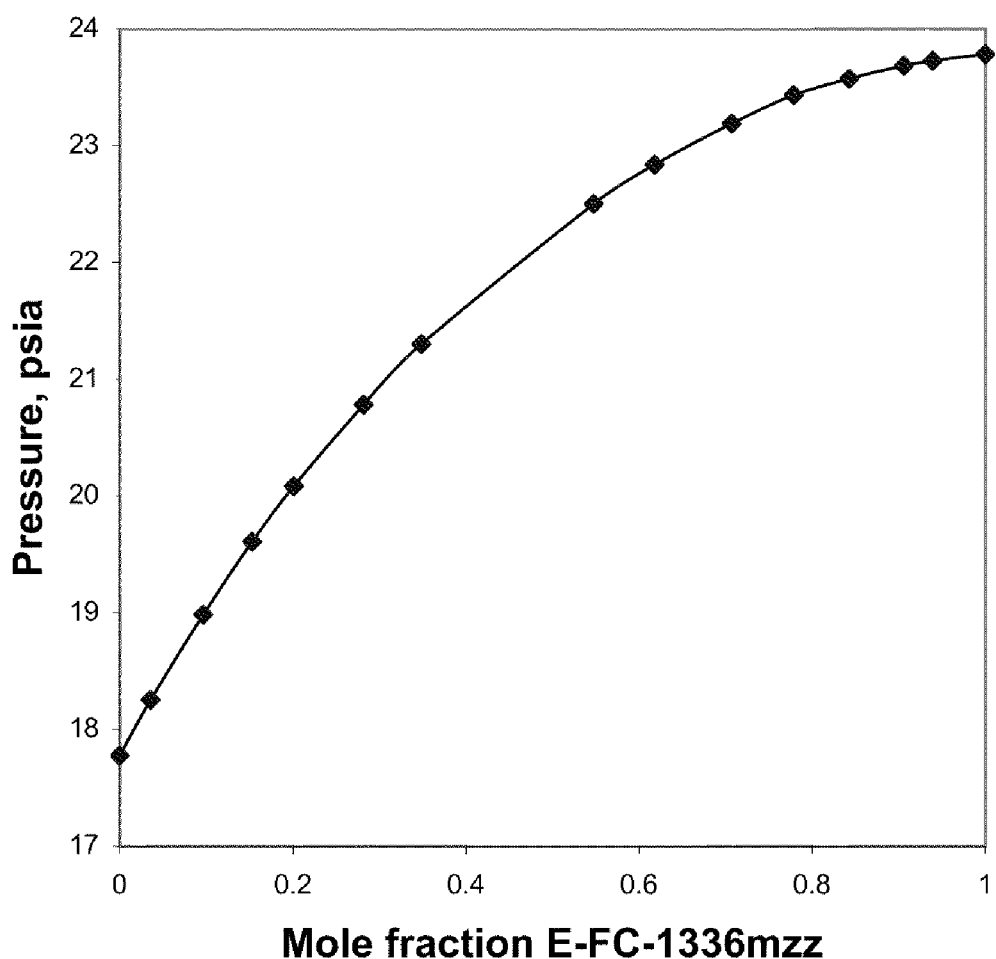
Figure 5. E-FC-1336mzz and HFC-245fa

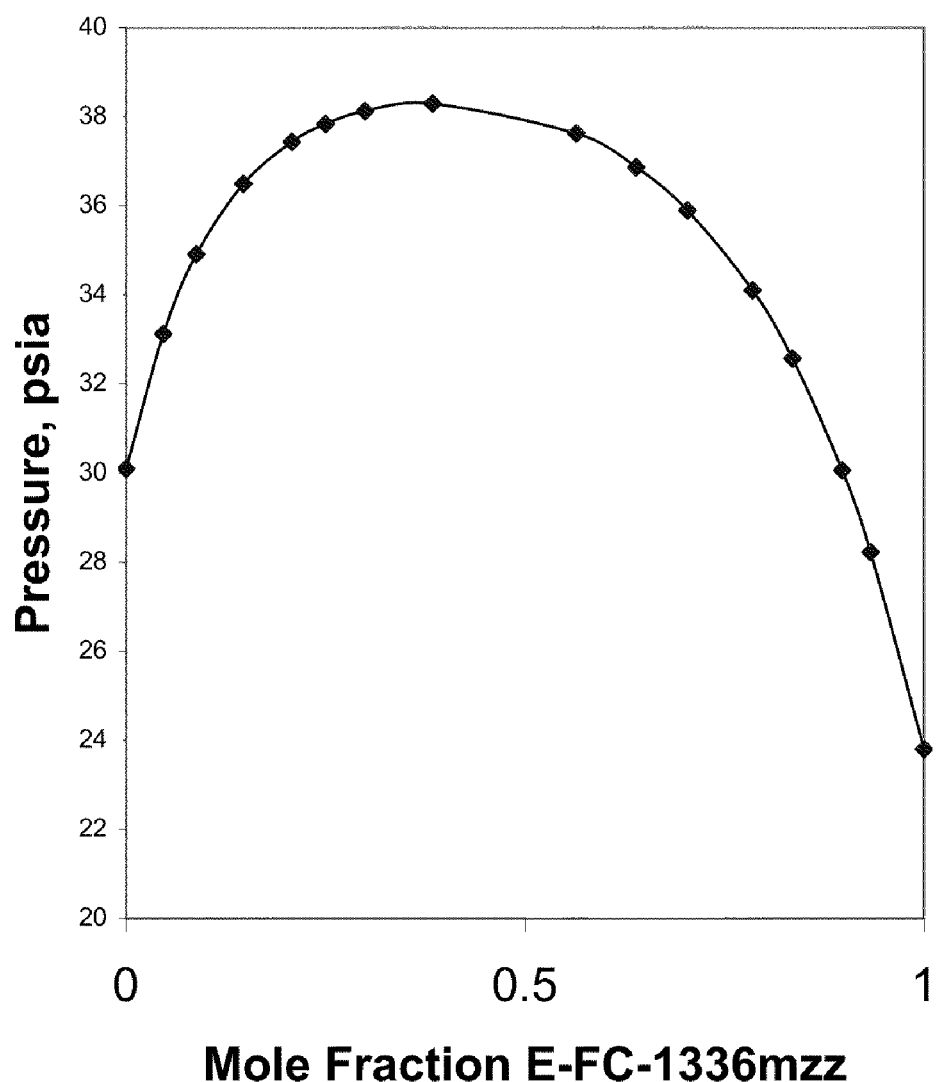
FIGURE 6. E-FC-1336mzz and n-Butane at 20 C

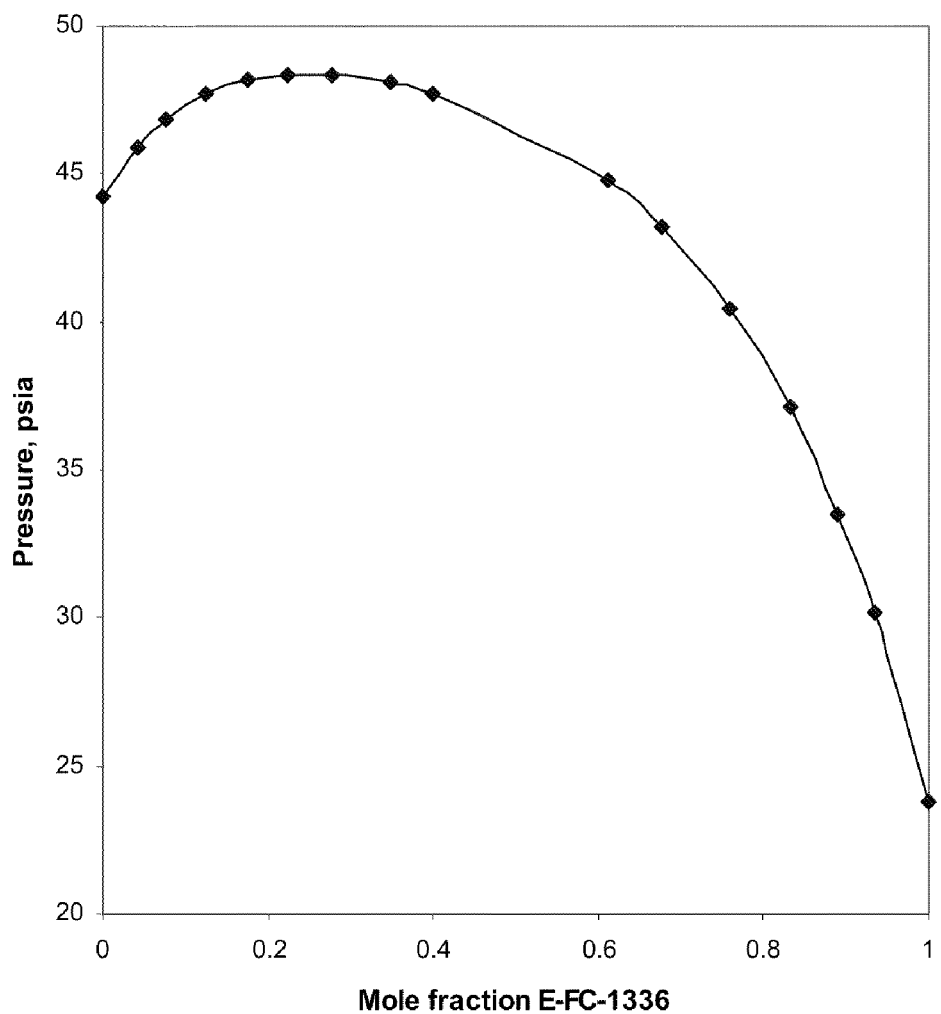
Figure 7. E-FC-1336mzz and Isobutane at 20.0 C

AZEOTROPIC AND AZEOTROPE-LIKE COMPOSITIONS OF E-1,1,1,4,4,4-HEXAFLUORO-2-BUTENE

This application represents a national filing under 35 U.S.C. 371 of International Application No. PCT/US08/66621 filed Jun. 12, 2008.

This application claims priority of U.S. Patent Applications 60/934,199 and 60/934,209 filed Jun. 12, 2007, U.S. Patent Application 60/936,082 filed Jun. 18, 2007, U.S. Patent Application 60/937,590 filed Jun. 28, 2007, U.S. Patent Applications 60/970,387 and 60/970,384 filed Sep. 6, 2007, and U.S. Patent Application 60/993,241 filed Sep. 11, 2007.

BACKGROUND OF THE INVENTION

1. Field of the Disclosure

The present disclosure relates to azeotropic or azeotrope-like compositions of E-1,1,1,4,4,4-hexafluoro-2-butene.

2. Description of Related Art

Many industries have been working for the past few decades to find replacements for the ozone depleting chlorofluorocarbons (CFCs) and hydrochlorofluorocarbons (HCFCs). The CFCs and HCFCs have been employed in a wide range of applications, including their use as aerosol propellants, refrigerants, cleaning agents, expansion agents for thermoplastic and thermoset foams, heat transfer media, gaseous dielectrics, fire extinguishing and suppression agents, power cycle working fluids, polymerization media, particulate removal fluids, carrier fluids, buffing abrasive agents, and displacement drying agents. In the search for replacements for these versatile compounds, many industries have turned to the use of hydrofluorocarbons (HFCs).

The HFCs do not contribute to the destruction of stratospheric ozone, but are of concern due to their contribution to the "greenhouse effect", i.e., they contribute to global warming. As a result of their contribution to global warming, the HFCs have come under scrutiny, and their widespread use may also be limited in the future. Thus, there is a need for compositions that do not contribute to the destruction of stratospheric ozone and also have low global warming potentials (GWPs). Certain hydrofluoroolefins, such as 1,1,1,4,4,4-hexafluoro-2-butene ($CF_3CH=CHCF_3$, FC-1336mzz), are believed to meet both goals.

SUMMARY OF THE INVENTION

This application includes seven different types of azeotropic or azeotrope-like mixtures.

This disclosure provides a composition consisting essentially of (a) E-FC-1336mzz and (b) methyl formate; wherein the methyl formate is present in an effective amount to form an azeotrope-like mixture with E-FC-1336mzz.

This disclosure also provides a composition consisting essentially of (a) E-FC-1336mzz and (b) n-pentane; wherein the n-pentane is present in an effective amount to form an azeotropic or azeotrope-like mixture with E-FC-1336mzz.

This disclosure also provides a composition consisting essentially of (a) E-FC-1336mzz and (b) 2-methyl butane (isopentane); wherein the isopentane is present in an effective amount to form an azeotropic or azeotrope-like mixture with E-FC-1336mzz.

This disclosure also provides a composition consisting essentially of (a) E-FC-1336mzz and (b) trans-1,2-dichloroethylene; wherein the trans-1,2-dichloroethylene is present in an effective amount to form an azeotrope-like mixture with E-FC-1336mzz.

This disclosure also provides a composition consisting essentially of (a) E-FC-1336mzz and (b) 1,1,1,3,3-pentafluoropropane ($CF_3CH_2CF_2H$, HFC-245fa); wherein the HFC-245fa is present in an effective amount to form an azeotrope-like mixture with E-FC-1336mzz.

The disclosure also provides a composition consisting essentially of (a) E-FC-1336mzz and (b) n-butane; wherein the n-butane is present in an effective amount to form an azeotropic or azeotrope-like mixture with E-FC-1336mzz.

The disclosure also provides a composition consisting essentially of (a) E-FC-1336mzz and (b) 2-methyl-propane (isobutane); wherein the 2-methylpropane is present in an effective amount to form an azeotropic or azeotrope-like mixture with E-FC-1336mzz.

BRIEF SUMMARY OF THE DRAWINGS

FIG. 1 is a graphical representation of azeotrope-like compositions consisting essentially of E-FC-1336mzz and methyl formate at a temperature of about 20.0° C.

FIG. 2 is a graphical representation of an azeotrope and azeotrope-like compositions consisting essentially of E-FC-1336mzz and n-pentane at a temperature of about 20.0° C.

FIG. 3 is a graphical representation of an azeotrope and azeotrope-like compositions consisting essentially of E-FC-1336mzz and isopentane at a temperature of about 20.0° C.

FIG. 4 is a graphical representation of azeotrope-like compositions consisting essentially of E-FC-1336mzz and trans-1,2-dichloroethylene at a temperature of about 20.0° C.

FIG. 5 is a graphical representation of azeotrope-like compositions consisting essentially of E-FC-1336mzz and HFC-245fa at a temperature of about 20.0° C.

FIG. 6 is a graphical representation of an azeotrope and azeotrope-like compositions consisting essentially of E-FC-1336mzz and n-butane at a temperature of about 20.0° C.

FIG. 7 is a graphical representation of an azeotrope and azeotrope-like compositions consisting essentially of E-FC-1336mzz and isobutane at a temperature of about 20.0° C.

DETAILED DESCRIPTION OF THE INVENTION

In many applications, the use of a pure single component or an azeotropic or azeotrope-like mixture is desirable. For example, when a blowing agent composition (also known as foam expansion agents or foam expansion compositions) is not a pure single component or an azeotropic or azeotrope-like mixture, the composition may change during its application in the foam forming process. Such change in composition could detrimentally affect processing or cause poor performance in the application. Also, in refrigeration applications, a refrigerant is often lost during operation through leaks in shaft seals, hose connections, soldered joints and broken lines. In addition, the refrigerant may be released to the atmosphere during maintenance procedures on refrigeration equipment. If the refrigerant is not a pure single component or an azeotropic or azeotrope-like composition, the refrigerant composition may change when leaked or discharged to the atmosphere from the refrigeration equipment. The change in refrigerant composition may cause the refrigerant to become flammable or to have poor refrigeration performance. Accordingly, there is a need for using azeotropic or azeotrope-like mixtures in these and other applications, for example azeotropic or azeotrope-like mixtures containing E-1,1,1,4,4,4-hexafluoro-2-butene (E-CF$_3$CH=CHCF$_3$, E-FC-1336mzz).

Before addressing details of embodiments described below, some terms are defined or clarified.

FC-1336mzz may exist as one of two configurational isomers, E or Z. FC-1336mzz as used herein refers to the isomers, Z-FC-1336mzz or E-FC-1336mzz, as well as any combinations or mixtures of such isomers.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

E-FC-1336mzz is a known compound, and its preparation method has been disclosed, for example, in Dawoodi, et. al., Journal of the Chemical Society, Chemical Communications (1982), (12), 696-8, hereby incorporated by reference in its entirety.

This application includes azeotropic or azeotrope-like compositions comprising E-FC-1336mzz.

In some embodiments of this invention, the composition consists essentially of (a) E-FC-1336mzz and (b) methyl formate; wherein the methyl formate is present in an effective amount to form an azeotrope-like mixture with E-FC-1336mzz.

In some embodiments of this invention, the composition consists essentially of (a) E-FC-1336mzz and (b) n-pentane; wherein the n-pentane is present in an effective amount to form an azeotropic or azeotrope-like mixture with E-FC-1336mzz.

In some embodiments of this invention, the composition consists essentially of (a) E-FC-1336mzz and (b) isopentane; wherein the isopentane is present in an effective amount to form an azeotropic or azeotrope-like mixture with E-FC-1336mzz.

In some embodiments of this invention, the composition consists essentially of (a) E-FC-1336mzz and (b) trans-1,2-dichloroethylene; wherein the trans-1,2-dichloroethylene is present in an effective amount to form an azeotrope-like mixture with E-FC-1336mzz.

In some embodiments of this invention, the composition consists essentially of (a) E-FC-1336mzz and (b) HFC-245fa; wherein the HFC-245fa is present in an effective amount to form an azeotrope-like mixture with E-FC-1336mzz.

In some embodiments of this invention, the composition consists essentially of (a) E-FC-1336mzz and (b) n-butane; wherein the n-butane is present in an effective amount to form an azeotropic or azeotrope-like mixture with E-FC-1336mzz.

In some embodiments of this invention, the composition consists essentially of (a) E-FC-1336mzz and (b) 2-methylpropane (isobutane); wherein the 2-methylpropane is present in an effective amount to form an azeotropic or azeotrope-like mixture with E-FC-1336mzz.

By effective amount is meant an amount, which, when combined with E-FC-1336mzz, results in the formation of an azeotropic or azeotrope-like mixture. This definition includes the amounts of each component, which amounts may vary depending on the pressure applied to the composition so long as the azeotropic or azeotrope-like compositions continue to exist at the different pressures, but with possible different boiling points. Therefore, effective amount includes the amounts, such as may be expressed in weight or mole percentages, of each component of the compositions of the instant invention which form azeotropic or azeotrope-like compositions at temperatures or pressures other than as described herein.

As recognized in the art, an azeotropic composition is an admixture of two or more different components which, when in liquid form under a given pressure, will boil at a substantially constant temperature, which temperature may be higher or lower than the boiling temperatures of the individual components, and which will provide a vapor composition essentially identical to the overall liquid composition undergoing boiling. (see, e.g., M. F. Doherty and M. F. Malone, Conceptual Design of Distillation Systems, McGraw-Hill (New York), 2001, 185-186, 351-359).

Accordingly, the essential features of an azeotropic composition are that at a given pressure, the boiling point of the liquid composition is fixed and that the composition of the vapor above the boiling composition is essentially that of the overall boiling liquid composition (i.e., no fractionation of the components of the liquid composition takes place). It is also recognized in the art that both the boiling point and the weight percentages of each component of the azeotropic composition may change when the azeotropic composition is subjected to boiling at different pressures. Thus, an azeotropic composition may be defined in terms of the unique relationship that exists among the components or in terms of the compositional ranges of the components or in terms of exact weight percentages of each component of the composition characterized by a fixed boiling point at a specified pressure.

For the purpose of this invention, an azeotrope-like composition means a composition that behaves like an azeotropic composition (i.e., has constant boiling characteristics or a tendency not to fractionate upon boiling or evaporation). Hence, during boiling or evaporation, the vapor and liquid compositions, if they change at all, change only to a minimal or negligible extent. This is to be contrasted with non-azeotrope-like compositions in which during boiling or evaporation, the vapor and liquid compositions change to a substantial degree.

Additionally, azeotrope-like compositions exhibit dew point pressure and bubble point pressure with virtually no pressure differential. That is to say that the difference in the dew point pressure and bubble point pressure at a given temperature will be a small value. In this invention, compositions with a difference in dew point pressure and bubble point pressure of less than or equal to 5 percent (based upon the bubble point pressure) is considered to be azeotrope-like.

It is recognized in this field that when the relative volatility of a system approaches 1.0, the system is defined as forming an azeotropic or azeotrope-like composition. Relative volatility is the ratio of the volatility of component 1 to the volatility of component 2. The ratio of the mole fraction of a component in vapor to that in liquid is the volatility of the component.

To determine the relative volatility of any two compounds, a method known as the PTx method can be used. In this procedure, the total absolute pressure in a cell of known volume is measured at a constant temperature for various compositions of the two compounds. Use of the PTx Method is described in detail in "Phase Equilibrium in Process Design", Wiley-Interscience Publisher, 1970, written by Harold R. Null, on pages 124 to 126; hereby incorporated by reference.

These measurements can be converted into equilibrium vapor and liquid compositions in the PTx cell by using an activity coefficient equation model, such as the Non-Random, Two-Liquid (NRTL) equation, to represent liquid phase non-idealities. Use of an activity coefficient equation, such as the NRTL equation is described in detail in "The Properties of Gases and Liquids," 4th edition, published by McGraw Hill, written by Reid, Prausnitz and Poling, on pages 241 to 387, and in "Phase Equilibria in Chemical Engineering," published by Butterworth Publishers, 1985, written by Stanley M. Walas, pages 165 to 244. Both aforementioned references are hereby incorporated by reference. Without wishing to be bound by any theory or explanation, it is believed that the NRTL equation, together with the PTx cell data, can sufficiently predict the relative volatilities of the E-1,1,1,4,4,4-hexafluoro-2-butene-containing compositions of the present invention and can therefore predict the behavior of these mixtures in multi-stage separation equipment such as distillation columns.

It was found through experiments that E-FC-1336mzz and n-pentane form azeotropic or azeotrope-like compositions.

To determine the relative volatility of this binary pair, the PTx method described above was used. The total absolute pressure in a PTx cell of known volume was measured at constant temperature for various binary compositions. These measurements were then reduced to equilibrium vapor and liquid compositions in the cell using the NRTL equation.

The vapor pressure measured versus the compositions in the PTx cell for E-FC-1336mzz/n-pentane mixture is shown in FIG. 2, which graphically illustrates the formation of an azeotropic and azeotrope-like composition consisting essentially of E-FC-1336mzz and n-pentane as indicated by a mixture of about 84.6 mole % E-1,1,1,4,4,4-hexafluoro-2-butene and 15.4 mole % n-pentane having the highest pressure over the range of compositions at this temperature. Based upon these findings, it has been calculated that E-FC-1336mzz and n-pentane form azeotropic compositions ranging from about 82.2 mole percent to about 95.3 mole percent E-FC-1336mzz and from about 17.8 mole percent to about 4.7 mole percent n-pentane (which form azeotropic compositions boiling at a temperature of from about −20° C. to about 80° C. and at a pressure of from about 4.5 psia (31 kPa) to about 139 psia (951 kPa)). Some embodiments of azeotropic compositions are listed in Table 1.

TABLE 1

Azeotropic compositions

| Azeotropic Temperature (° C.) | Azeotropic Pressure (psia) | E-FC-1336mzz (mole %) | n-Pentane (mole %) |
|---|---|---|---|
| −20.0 | 4.55 | 82.2 | 17.8 |
| −10.0 | 7.36 | 82.5 | 17.5 |
| 0.0 | 11.4 | 83.0 | 17.0 |
| 10.0 | 17.0 | 83.7 | 16.3 |
| 20.0 | 24.6 | 84.6 | 15.4 |
| 30.0 | 34.6 | 85.7 | 14.3 |
| 40.0 | 47.5 | 87.0 | 13.0 |
| 50.0 | 63.8 | 88.6 | 11.4 |
| 60.0 | 83.9 | 90.5 | 9.5 |
| 70.0 | 108.6 | 92.7 | 7.3 |
| 80.0 | 138.6 | 95.3 | 4.7 |

Additionally, azeotrope-like compositions containing E-FC-1336mzz and n-pentane may also be formed. Such azeotrope-like compositions exist around azeotropic compositions. Some embodiments of azeotrope-like compositions are listed in Table 2. Additional embodiments of azeotrope-like compositions are listed in Table 3.

TABLE 2

Azeotrope-like compositions

| COMPONENTS | T (° C.) | Weight Percentage Range |
|---|---|---|
| E-FC-1336mzz/n-Pentane | −40 | 88-99/1-12 |
| E-FC-1336mzz/n-Pentane | 0 | 86-99/1-14 |
| E-FC-1336mzz/n-Pentane | 20 | 86-99/1-14 |
| E-FC-1336mzz/n-Pentane | 40 | 85-99/1-15 |
| E-FC-1336mzz/n-Pentane | 80 | 84-99/1-16 |
| E-FC-1336mzz/n-Pentane | 120 | 83-99/1-17 |

TABLE 3

Azeotrope-like compositions

| COMPONENTS | T (° C.) | Weight Percentage Range |
|---|---|---|
| E-FC-1336mzz/n-Pentane | −40 | 88-95/5-12 |
| E-FC-1336mzz/n-Pentane | 0 | 86-95/5-14 |
| E-FC-1336mzz/n-Pentane | 20 | 86-95/5-14 |
| E-FC-1336mzz/n-Pentane | 40 | 85-95/5-15 |
| E-FC-1336mzz/n-Pentane | 80 | 10-90/10-90 and 84-95/5-16 |
| E-FC-1336mzz/n-Pentane | 120 | 83-95/5-17 |

It was found through experiments that E-FC-1336mzz and methyl formate form azeotrope-like compositions. To determine the relative volatility of this binary pair, the PTx method described above was used. The total absolute pressure in a PTx cell of known volume was measured at constant temperature for various binary compositions. These measurements were then reduced to equilibrium vapor and liquid compositions in the cell using the NRTL equation.

The vapor pressure measured versus the compositions in the PTx cell for E-FC-1336mzz/methyl formate mixture is shown in FIG. 1, which illustrates graphically the formation of azeotrope-like compositions consisting essentially of E-1,1,1,4,4,4-hexafluoro-2-butene and methyl formate at 20.0° C., as indicated by mixtures of about 83 mole % to about 99 mole % E-1,1,1,4,4,4-hexafluoro-2-butene and about 17 to about 1 mole % methyl formate.

Some embodiments of azeotrope-like compositions are listed in Table 4. Additional embodiments of azeotrope-like compositions are listed in Table 5.

TABLE 4

Azeotrope-like Compositions

| COMPONENTS | T (° C.) | Weight % Range |
|---|---|---|
| E-FC-1336mzz/Methyl formate | −40 | 96-99/1-4 |
| E-FC-1336mzz/Methyl formate | 0 | 95-99/1-5 |
| E-FC-1336mzz/Methyl formate | 40 | 92-99/1-8 |
| E-FC-1336mzz/Methyl formate | 80 | 86-99/1-14 |
| E-FC-1336mzz/Methyl formate | 120 | 73-99/1-27 |

TABLE 5

Azeotrooe-like Compositions

| COMPONENTS | T (° C.) | Weight % Range |
|---|---|---|
| E-FC-1336mzz/Methyl formate | −40 | 98-99/1-2 |
| E-FC-1336mzz/Methyl formate | 0 | 97-99/1-3 |
| E-FC-1336mzz/Methyl formate | 40 | 95-99/1-5 |
| E-FC-1336mzz/Methyl formate | 80 | 92-99/1-8 |
| E-FC-1336mzz/Methyl formate | 120 | 87-99/1-13 |

It was found through experiments that E-FC-1336mzz and isopentane form azeotropic or azeotrope-like compositions. To determine the relative volatility of this binary pair, the PTx method described above was used. The total absolute pressure in a PTx cell of known volume was measured at constant temperature for various binary compositions. These measurements were then reduced to equilibrium vapor and liquid compositions in the cell using the NRTL equation.

The vapor pressure measured versus the compositions in the PTx cell for E-FC-1336mzz/isopentane mixture is shown in FIG. 3, which illustrates graphically the formation of an azeotrope and azeotrope-like compositions of E-1,1,1,4,4,4-hexafluoro-2-butene and isopentane at 20.0° C., as indicated by a mixture of about 77.2 mole % E-1,1,1,4,4,4-hexafluoro-2-butene and 22.8 mole % isopentane having the highest pressure over the range of compositions at this temperature.

Based upon these findings, it has been calculated that E-FC-1336mzz and isopentane form azeotropic compositions ranging from about 75.1 mole percent to about 95.4 mole percent E-FC-1336mzz and from about 24.9 mole percent to about 4.6 mole percent isopentane (which form azeotropic compositions boiling at a temperature of from about −40° C. to about 100° C. and at a pressure of from about 1.6 psia (11 kPa) to about 218 psia (1503 kPa)). Some embodiments of azeotropic compositions are listed in Table 6.

TABLE 6

Azeotropic compositions

| Azeotropic Temperature (° C.) | Azeotropic Pressure (psia) | E-FC-1336mzz (mole %) | Isopentane (mole %) |
|---|---|---|---|
| −20.0 | 4.8 | 75.0 | 25.0 |
| −10.0 | 7.7 | 75.3 | 24.7 |
| 0.0 | 12.0 | 75.7 | 24.3 |
| 10.0 | 17.8 | 76.4 | 23.6 |
| 20.0 | 25.6 | 77.2 | 22.8 |
| 30.0 | 35.9 | 78.3 | 21.7 |
| 40.0 | 49.0 | 79.5 | 20.5 |
| 50.0 | 65.4 | 81.1 | 18.9 |
| 60.0 | 85.6 | 83.0 | 17.0 |
| 70.0 | 110.3 | 85.2 | 14.8 |
| 80.0 | 140.0 | 88.0 | 12.0 |
| 90.0 | 175.6 | 91.3 | 8.7 |
| 100.0 | 217.9 | 95.4 | 4.6 |

Additionally, azeotrope-like compositions containing E-FC-1336mzz and isopentane may also be formed. Such azeotrope-like compositions exist around azeotropic compositions. Some embodiments of azeotrope-like compositions are listed in Table 7. Additional embodiments of azeotrope-like compositions are listed in Table 8.

TABLE 7

Azeotrope-like Compositions

| COMPONENTS | T (° C.) | Weight % Range |
|---|---|---|
| E-FC-1336mzz/isopentane | −40 | 81-94/6-19 |
| E-FC-1336mzz/isopentane | 0 | 80-99/1-20 |
| E-FC-1336mzz/isopentane | 40 | 80-99/1-20 |
| E-FC-1336mzz/isopentane | 80 | 79-99/1-21 |
| E-FC-1336mzz/isopentane | 100 | 77-99/1-23 |

TABLE 8

Azeotrope-like Compositions

| COMPONENTS | T (° C.) | Weight % Range |
|---|---|---|
| E-FC-1336mzz/isopentane | −40 | 81-95/5-19 |
| E-FC-1336mzz/isopentane | 0 | 80-95/5-20 |
| E-FC-1336mzz/isopentane | 40 | 80-95/5-20 |
| E-FC-1336mzz/isopentane | 80 | 79-95/5-21 |
| E-FC-1336mzz/isopentane | 100 | 77-95/5-23 |

It was found through experiments that E-FC-1336mzz and trans-1,2-dichloroethylene form azeotrope-like compositions. To determine the relative volatility of this binary pair, the PTx method described above was used. The total absolute pressure in a PTx cell of known volume was measured at constant temperature for various binary compositions. These measurements were then reduced to equilibrium vapor and liquid compositions in the cell using the NRTL equation.

The vapor pressure measured versus the compositions in the PTx cell for E-FC-1336mzz/trans-1,2-dichloroethylene mixture is shown in FIG. 4, which illustrates graphically the formation of azeotrope-like compositions of E-1,1,1,4,4,4-hexafluoro-2-butene and trans-1,2-dichloroethylene at 20.0° C., as indicated by mixtures comprised of about 84 mole % to about 99 mole % E-1336mzz and from about 16 to about 1 mole % trans-1,2-dichloroethylene.

Some embodiments of azeotrope-like compositions are listed in Table 9. Additional embodiments of azeotrope-like compositions are listed in Table 10.

TABLE 9

Azeotrope-like Compositions

| COMPONENTS | T (° C.) | Weight % Range |
|---|---|---|
| E-FC-1336mzz/Trans-1,2-dichloroethylene | −40 | 92-99/1-8 |
| E-FC-1336mzz/Trans-1,2-dichloroethylene | 0 | 90-99/1-10 |
| E-FC-1336mzz/Trans-1,2-dichloroethylene | 40 | 90-99/1-10 |
| E-FC-1336mzz/Trans-1,2-dichloroethylene | 80 | 89-99/1-11 |
| E-FC-1336mzz/Trans-1,2-dichloroethylene | 120 | 88-99/1-12 |

TABLE 10

Azeotrope-like Compositions

| COMPONENTS | T (° C.) | Weight % Range, |
|---|---|---|
| E-FC-1336mzz/Trans-1,2-dichloroethylene | −40 | 94-99/1-6 |
| E-FC-1336mzz/Trans-1,2-dichloroethylene | 0 | 93-99/1-7 |
| E-FC-1336mzz/Trans-1,2-dichloroethylene | 40 | 92-99/1-8 |
| E-FC-1336mzz/Trans-1,2-dichloroethylene | 80 | 92-99/1-8 |
| E-FC-1336mzz/Trans-1,2-dichloroethylene | 120 | 93-99/1-7 |

It was found through experiments that E-FC-1336mzz and HFC-245fa form azeotrope-like compositions. To determine the relative volatility of this binary pair, the PTx method described above was used. The total absolute pressure in a PTx cell of known volume was measured at constant temperature for various binary compositions. These measurements were then reduced to equilibrium vapor and liquid compositions in the cell using the NRTL equation.

The vapor pressure measured versus the compositions in the PTx cell for E-FC-1336mzz/HFC-245fa mixture is shown in FIG. 5, which illustrates graphically the formation of azeotrope-like compositions of E-1,1,1,4,4,4-hexafluoro-2-butene and HFC-245fa at 20.0° C., as indicated by mixtures of about 1 to 99 mole % E-1,1,1,4,4,4-hexafluoro-2-butene and about 99 to 1 mole % HFC-245fa.

Some embodiments of azeotrope-like compositions are listed in Table 11. Additional embodiments of azeotrope-like compositions are listed in Table 12.

TABLE 11

Azeotrope-like Compositions

| COMPONENTS | T (° C.) | Weight % Range |
|---|---|---|
| E-FC-1336mzz/HFC-245fa | −40 | 1-99/1-99 |
| E-FC-1336mzz/HFC-245fa | 0 | 1-99/1-99 |
| E-FC-1336mzz/HFC-245fa | 40 | 1-99/1-99 |
| E-FC-1336mzz/HFC-245fa | 80 | 1-99/1-99 |
| E-FC-1336mzz/HFC-245fa | 120 | 1-99/1-99 |

TABLE 12

Azeotrope-like Compositions

| COMPONENTS | T (° C.) | Weight % Range |
|---|---|---|
| E-FC-1336mzz/HFC-245fa | −40 | 10-90/10-90 |
| E-FC-1336mzz/HFC-245fa | 0 | 10-90/10-90 |
| E-FC-1336mzz/HFC-245fa | 40 | 10-90/10-90 |
| E-FC-1336mzz/HFC-245fa | 80 | 10-90/10-90 |
| E-FC-1336mzz/HFC-245fa | 120 | 10-90/10-90 |

It was found through experiments that E-FC-1336mzz and n-butane form azeotropic or azeotrope-like compositions. To determine the relative volatility of this binary pair, the PTx method described above was used. The total absolute pressure in a PTx cell of known volume was measured at constant temperature for various binary compositions. These measurements were then reduced to equilibrium vapor and liquid compositions in the cell using the NRTL equation.

The vapor pressure measured versus the compositions in the PTx cell for E-FC-1336mzz/n-butane mixture is shown in FIG. 6, which illustrates graphically the formation of an azeotropic composition of E-1,1,1,4,4,4-hexafluoro-2-butene and cyclopentane at 20.0° C., as indicated by a mixture of about 38.1 mole % E-1,1,1,4,4,4-hexafluoro-2-butene and 61.9 mole % n-butane having the highest pressure over the range of compositions at this temperature.

Based upon these findings, it has been calculated that E-FC-1336mzz and n-butane form azeotropic compositions ranging from about 29.5 mole percent to about 47.2 mole percent E-FC-1336mzz and from about 70.5 mole percent to about 52.8 mole percent n-butane (which form azeotropic compositions boiling at a temperature of from about −40° C. to about 100° C. and at a pressure of from about 3.0 psia (21 kPa) to about 277 psia (1910 kPa)). Some embodiments of azeotropic compositions are listed in Table 13.

TABLE 13

Azeotropic Compositions

| Azeotropic Temperature (° C.) | Azeotropic Pressure (psia) | E-FC-1336mzz (mole %) | n-butane (mole %) |
|---|---|---|---|
| −40 | 3.0 | 29.5% | 70.5% |
| −30 | 5.1 | 31.3% | 68.7% |
| −20 | 8.2 | 33.0% | 67.0% |
| −10 | 12.7 | 34.5% | 65.5% |
| 0 | 19.0 | 35.8% | 64.2% |
| 10 | 27.4 | 37.0% | 63.0% |
| 20 | 38.3 | 38.1% | 61.9% |
| 30 | 52.3 | 39.2% | 60.8% |
| 40 | 69.7 | 40.2% | 59.8% |
| 50 | 91.1 | 41.2% | 58.8% |
| 60 | 116.8 | 42.2% | 57.8% |
| 70 | 147.6 | 43.3% | 56.7% |
| 80 | 183.9 | 44.4% | 55.6% |
| 90 | 226.5 | 45.7% | 54.3% |
| 100 | 276.6 | 47.2% | 52.8% |

Additionally, azeotrope-like compositions containing E-FC-1336mzz and n-butane may also be formed. Such azeotrope-like compositions exist around azeotropic compositions. Some embodiments of azeotrope-like compositions are listed in Table 14. Additional embodiments of azeotrope-like compositions are listed in Table 15.

TABLE 14

Azeotrope-like Compositions

| COMPONENTS | T (° C.) | Weight % Range |
|---|---|---|
| E-FC-1336mzz/n-butane | −40 | 38-64/36-62 |
| E-FC-1336mzz/n-butane | 0 | 44-72/28-56 |
| E-FC-1336mzz/n-butane | 40 | 1-13/87-99 and 43-80/20-57 and 98-99/1-2 |
| E-FC-1336mzz/n-butane | 80 | 1-91/9-99 and 94-99/1-6 |
| E-FC-1336mzz/n-butane | 100 | 1-99/1-99 |

TABLE 15

Azeotrope-like Compositions

| COMPONENTS | T (° C.) | Weight % Range |
|---|---|---|
| E-FC-1336mzz/n-butane | −40 | 50-64/36-50 |
| E-FC-1336mzz/n-butane | 0 | 50-72/28-50 |
| E-FC-1336mzz/n-butane | 40 | 10-13/87-90 and 43-80/20-57 |
| E-FC-1336mzz/n-butane | 80 | 10-90/10-90 |
| E-FC-1336mzz/n-butane | 100 | 10-90/10-90 |

It was found through experiments that E-FC-1336mzz and isobutane form azeotropic or azeotrope-like compositions. To determine the relative volatility of this binary pair, the PTx method described above was used. The total absolute pressure in a PTx cell of known volume was measured at constant temperature for various binary compositions. These measurements were then reduced to equilibrium vapor and liquid compositions in the cell using the NRTL equation.

The vapor pressure measured versus the compositions in the PTx cell for E-FC-1336mzz/isobutane mixture is shown in FIG. 7, which illustrates graphically the formation of an azeotropic composition of E-1,1,1,4,4,4-hexafluoro-2-butene and cyclopentane at 20.0° C., as indicated by a mixture of about 24.9 mole % E-1,1,1,4,4,4-hexafluoro-2-butene and 75.1 mole % isobutane having the highest pressure over the range of compositions at this temperature.

Based upon these findings, it has been calculated that E-FC-1336mzz and isobutane form azeotropic compositions ranging from about 19.4 mole percent to about 32.4 mole percent E-FC-1336mzz and from about 80.6 mole percent to about 67.6 mole percent isobutane (which form azeotropic compositions boiling at a temperature of from about –40° C. to about 80° C. and at a pressure of from about 4.5 psia (31 kPa) to about 218 psia (1503 kPa)). Some embodiments of azeotropic compositions are listed in Table 16.

TABLE 16

Azeotropic Compositions

| Azeotropic Temperature (° C.) | Azeotropic Pressure (psia) | E-FC-1336mzz (mole %) | isobutane (mole %) |
|---|---|---|---|
| −40 | 4.5 | 19.4% | 80.6% |
| −30 | 7.3 | 20.3% | 79.7% |
| −20 | 11.5 | 21.2% | 78.8% |
| −10 | 17.2 | 22.1% | 77.9% |
| 0 | 25.0 | 23.0% | 77.0% |
| 10 | 35.2 | 24.0% | 76.0% |
| 20 | 48.4 | 24.9% | 75.1% |
| 30 | 64.9 | 25.9% | 74.1% |
| 40 | 85.3 | 27.0% | 73.0% |
| 50 | 110.1 | 28.1% | 71.9% |
| 60 | 140.0 | 29.3% | 70.7% |
| 70 | 175.7 | 30.7% | 69.3% |
| 80 | 218.2 | 32.4% | 67.6% |

Additionally, azeotrope-like compositions containing E-FC-1336mzz and isobutane may also be formed. Such azeotrope-like compositions exist around azeotropic compositions. Some embodiments of azeotrope-like compositions are listed in Table 17. Additional embodiments of azeotrope-like compositions are listed in Table 18.

TABLE 17

Azeotrope-like Compositions

| COMPONENTS | T (° C.) | Weight Range |
|---|---|---|
| E-FC-1336mzz/Isobutane | −40 | 1-48.8/51.2-99 |
| E-FC-1336mzz/Isobutane | 0 | 1-59.3/40.7-99 |
| E-FC-1336mzz/Isobutane | 40 | 1-68.8/31.2-99 |
| E-FC-1336mzz/Isobutane | 80 | 1-78.7/21.3-99 |
| E-FC-1336mzz/Isobutane | 95 | 1-82.6/17.4-99 |

TABLE 18

Azeotrope-like Compositions

| COMPONENTS | T (° C.) | Weight Range, Preferred |
|---|---|---|
| E-FC-1336mzz/Isobutane | −40 | 10-47.4/52.6-90 |
| E-FC-1336mzz/Isobutane | 0 | 10-56.9/43.1-90 |
| E-FC-1336mzz/Isobutane | 40 | 10-65.3/34.7-90 |
| E-FC-1336mzz/Isobutane | 80 | 10-74.3/25.7-90 |
| E-FC-1336mzz/Isobutane | 95 | 10-77.7/22.3-90 |

The azeotropic or azeotrope-like compositions of the present invention can be prepared by any convenient method including mixing or combining the desired amounts. In one embodiment of this invention, an azeotropic or azeotrope-like composition can be prepared by weighing the desired component amounts and thereafter combining them in an appropriate container.

The azeotropic or azeotrope-like compositions of the present invention can be used in a wide range of applications, including their use as aerosol propellants, refrigerants, solvents, cleaning agents, blowing agents (foam expansion agents) for thermoplastic and thermoset foams, heat transfer media, gaseous dielectrics, fire extinguishing and suppression agents, power cycle working fluids, polymerization media, particulate removal fluids, carrier fluids, buffing abrasive agents, and displacement drying agents.

One embodiment of this invention provides a process for preparing a thermoplastic or thermoset foam. The process comprises using an azeotropic or azeotrope-like composition as a blowing agent, wherein said azeotropic or azeotrope-like composition consists essentially of E-1,1,1,4,4,4-hexafluoro-2-butene and a component selected from the group consisting of methyl formate, n-pentane, 2-methylbutane, trans-1,2-dichloroethylene, 1,1,1,3,3-pentafluoropropane, n-butane and isobutane.

Another embodiment of this invention provides a process for producing refrigeration. The process comprises condensing an azeotropic or azeotrope-like composition and thereafter evaporating said azeotropic or azeotrope-like composition in the vicinity of the body to be cooled, wherein said azeotropic or azeotrope-like composition consists essentially of E-1,1,1,4,4,4-hexafluoro-2-butene and a component selected from the group consisting of methyl formate, n-pentane, 2-methylbutane, trans-1,2-dichloroethylene, 1,1,1,3,3-pentafluoropropane, n-butane and isobutane.

Another embodiment of this invention provides a process using an azeotropic or azeotrope-like composition as a solvent, wherein said azeotropic or azeotrope-like composition consists essentially of E-1,1,1,4,4,4-hexafluoro-2-butene and a component selected from the group consisting of methyl formate, n-pentane, 2-methylbutane, trans-1,2-dichloroethylene, 1,1,1,3,3-pentafluoropropane, n-butane and isobutane.

Another embodiment of this invention provides a process for producing an aerosol product. The process comprises using an azeotropic or azeotrope-like composition as a propellant, wherein said azeotropic or azeotrope-like composition consists essentially of E-1,1,1,4,4,4-hexafluoro-2-butene and a component selected from the group consisting of methyl formate, n-pentane, 2-methylbutane, trans-1,2-dichloroethylene, 1,1,1,3,3-pentafluoropropane, n-butane and isobutane.

Another embodiment of this invention provides a process using an azeotropic or azeotrope-like composition as a heat transfer media, wherein said azeotropic or azeotrope-like composition consists essentially of E-1,1,1,4,4,4-hexafluoro-2-butene and a component selected from the group consisting of methyl formate, n-pentane, 2-methylbutane, 1, trans-1,2-dichloroethylene, 1,1,1,3,3-pentafluoropropane, n-butane and isobutane.

Another embodiment of this invention provides a process for extinguishing or suppressing a fire. The process comprises using an azeotropic or azeotrope-like composition as a fire extinguishing or suppression agent, wherein said azeotropic or azeotrope-like composition consists essentially of E-1,1,1,4,4,4-hexafluoro-2-butene and a component selected from the group consisting of methyl formate, n-pentane, 2-methylbutane, trans-1,2-dichloroethylene, 1,1,1,3,3-pentafluoropropane, n-butane and isobutane.

Another embodiment of this invention provides a process using an azeotropic or azeotrope-like composition as dielectrics, wherein said azeotropic or azeotrope-like composition consists essentially of E-1,1,1,4,4,4-hexafluoro-2-butene and a component selected from the group consisting of methyl formate, n-pentane, 2-methylbutane, trans-1,2-dichloroethylene, 1,1,1,3,3-pentafluoropropane, n-butane and isobutane.

The invention claimed is:

1. A composition consisting essentially of:
   (a) E-1,1,1,4,4,4-hexafluoro-2-butene; and
   (b) a component selected from the group consisting of methyl formate, n-pentane, 2-methylbutane, trans-1,2-dichloroethylene, 1,1,1,3,3-pentafluoropropane, n-butane and isobutane; wherein said component is present in an effective amount to form an azeotrope-like combination with the E-1,1,1,4,4,4-hexafluoro-2-butene.

2. A composition consisting essentially of:
   (a) E-1,1,1,4,4,4-hexafluoro-2-butene; and
   (b) a component selected from the group consisting of n-pentane, 2-methylbutane, n-butane and isobutane; wherein said component is present in an effective amount to form an azeotropic combination with the E-1,1,1,4,4,4-hexafluoro-2-butene.

3. A process for preparing a thermoplastic or thermoset foam comprising using the azeotrope-like composition of claim 1 as a blowing agent.

4. A process for preparing a thermoplastic or thermoset foam comprising using the azeotropic composition of claim 2 as a blowing agent.

5. A process for producing refrigeration comprising condensing the azeotrope-like composition of claim 1 and thereafter evaporating said azeotrope-like composition in the vicinity of the body to be cooled.

6. A process for producing refrigeration comprising condensing the azeotropic composition of claim 2 and thereafter evaporating said azeotropic composition in the vicinity of the body to be cooled.

7. A process comprising using the azeotrope-like composition of claim 1 as a solvent.

8. A process comprising using the azeotropic composition of claim 2 as a solvent.

9. A process for producing an aerosol product comprising using the azeotrope-like composition of claim 1 as a propellant.

10. A process for producing an aerosol product comprising using the azeotropic composition of claim 2 as a propellant.

11. A process comprising using the azeotrope-like composition of claim 1 as a heat transfer media.

12. A process comprising using the azeotropic composition of claim 2 as a heat transfer media.

13. A process for extinguishing or suppressing a fire comprising using the azeotrope-like composition of claim 1 as a fire extinguishing or suppression agent.

14. A process for extinguishing or suppressing a fire comprising using the azeotropic composition of claim 2 as a fire extinguishing or suppression agent.

15. A process comprising using the azeotrope-like composition of claim 1 as dielectrics.

16. A process comprising using the azeotropic composition of clam 2 as dielectrics.

17. The azeotrope-like composition of claim 1 consisting essentially of from 73 to 99 weight percent E-1,1,1,4,4,4-hexafluoro-2-butene and from 27 to 1 weight percent methyl formate, characterized by: at a temperature of from −40° C. to 120° C., said composition having a difference in dew point pressure and bubble point pressure of less than or equal to 5 percent based upon the bubble point pressure.

18. The azeotrope-like composition of claim 1 consisting essentially of from 83 to 99 weight percent E-1,1,1,4,4,4-hexafluoro-2-butene and from 17 to 1 weight percent n-pentane, characterized by: at a temperature of from −40° C. to 120° C., said composition having a difference in dew point pressure and bubble point pressure of less than or equal to 5 percent based upon the bubble point pressure.

19. The azeotrope-like composition of claim 1 consisting essentially of from 77 to 99 weight percent E-1,1,1,4,4,4-hexafluoro-2-butene and from 23 to 1 weight percent 2-methylbutane, characterized by: at a temperature of from −40° C. to 100° C., said composition having a difference in dew point pressure and bubble point pressure of less than or equal to 5 percent based upon the bubble point pressure.

20. The azeotrope-like composition of claim 1 consisting essentially of from 88 to 99 weight percent E-1,1,1,4,4,4-hexafluoro-2-butene and from 12 to 1 weight percent trans-1,2-dichloroethylene, characterized by: at a temperature of from −40° C. to 120° C., said composition having a difference in dew point pressure and bubble point pressure of less than or equal to 5 percent based upon the bubble point pressure.

21. The azeotrope-like composition of claim 1 consisting essentially of from 1 to 99 weight percent E-1,1,1,4,4,4-hexafluoro-2-butene and from 99 to 1 weight percent 1,1,1,3,3-pentafluoropropane, characterized by: at a temperature of from −40° C. to 120° C., said composition having a difference in dew point pressure and bubble point pressure of less than or equal to 5 percent based upon the bubble point pressure.

22. The azeotrope-like composition of claim 1 consisting essentially of from 1 to 99 weight percent E-1,1,1,4,4,4-hexafluoro-2-butene and from 99 to 1 weight percent n-butane, characterized by: at a temperature of from −40° C. to 100° C., said composition having a difference in dew point pressure and bubble point pressure of less than or equal to 5 percent based upon the bubble point pressure.

23. The azeotrope-like composition of claim 1 consisting essentially of from 38 to 80 weight percent E-1,1,1,4,4,4-hexafluoro-2-butene and from 62 to 20 weight percent n-butane, characterized by: at a temperature of from −40° C. to 40° C., said composition having a difference in dew point pressure and bubble point pressure of less than or equal to 5 percent based upon the bubble point pressure.

24. The azeotrope-like composition of claim 1 consisting essentially of from 1 to 82.6 weight percent E-1,1,1,4,4,4-hexafluoro-2-butene and from 99 to 17.4 weight percent isobutane, characterized by: at a temperature of from −40° C. to 95° C., said composition having a difference in dew point pressure and bubble point pressure of less than or equal to 5 percent based upon the bubble point pressure.

25. The azeotropic composition of claim 2 consisting essentially of from about 82.2 mole percent to about 95.3 mole percent E-1,1,1,4,4,4-hexafluoro-2-butene and from about 17.8 mole percent to about 4.7 mole percent n-pentane, which has boiling point temperature of from about −20° C. to about 80° C. at a pressure of from about 4.5 psia to about 139 psia.

26. The azeotropic composition of claim 2 consisting essentially of from about 75.1 mole percent to about 95.4 mole percent E-1,1,1,4,4,4-hexafluoro-2-butene and from about 24.9 mole percent to about 4.6 mole percent 2-methylbutane, which has boiling point temperature of from about −40° C. to about 100° C. at a pressure of from about 1.6 psia to about 218 psia.

27. The azeotropic composition of claim 2 consisting essentially of from about 29.5 mole percent to about 47.2 mole percent E-1,1,1,4,4,4-hexafluoro-2-butene and from about 70.5 mole percent to about 52.8 mole percent n-butane, which has boiling point temperature of from about −40° C. to about 100° C. at a pressure of from about 3.0 psia to about 277 psia.

28. The azeotropic composition of claim 2 consisting essentially of from about 19.4 mole percent to about 32.4 mole percent E-1,1,1,4,4,4-hexafluoro-2-butene and from about 80.6 mole percent to about 67.6 mole percent isobutane, which has boiling point temperature of from about −40° C. to about 80° C. at a pressure of from about 4.5 psia to about 218 psia.

* * * * *